United States Patent
Atkins et al.

(10) Patent No.: US 6,618,815 B1
(45) Date of Patent: Sep. 9, 2003

(54) ACCURATE DISTRIBUTED SYSTEM TIME OF DAY

(75) Inventors: Mark G. Atkins, Clinton Corners, NY (US); Jay R. Herring, Poughkeepsie, NY (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/515,445

(22) Filed: Feb. 29, 2000

(51) Int. Cl.[7] ................................................ G06F 1/12
(52) U.S. Cl. ...................... 713/400; 709/248; 709/400; 375/356
(58) Field of Search .................... 713/400; 709/248, 709/400; 375/356

(56) References Cited

U.S. PATENT DOCUMENTS

| | | | |
|---|---|---|---|
| 4,531,185 A | 7/1985 | Halpern et al. | 364/200 |
| 4,882,739 A | 11/1989 | Potash et al. | 375/109 |
| 4,890,222 A * | 12/1989 | Kirk | 713/400 |
| 5,327,468 A * | 7/1994 | Edblad et al. | 375/356 |
| 5,416,808 A | 5/1995 | Witsaman et al. | 375/350 |
| 5,504,878 A | 4/1996 | Coscarella et al. | 709/248 |
| 5,530,846 A * | 6/1996 | Strong | 713/400 |
| 5,537,549 A * | 7/1996 | Gee et al. | 709/224 |
| 5,579,513 A | 11/1996 | Strohmer | 713/600 |
| 5,636,373 A | 6/1997 | Glendening et al. | 713/400 |
| 5,712,882 A | 1/1998 | Miller | 375/356 |
| 5,925,107 A * | 7/1999 | Bartfai et al. | 709/248 |
| 6,246,701 B1 * | 6/2001 | Slattery | 370/503 |
| 6,449,291 B1 * | 9/2002 | Burns et al. | 370/516 |

FOREIGN PATENT DOCUMENTS

WO    WO 9856135 A2 * 12/1998 ............. H04L/7/00

OTHER PUBLICATIONS

Abali, B., Stunkel, C.B., and Benveniste, C., "Clock Synchronization on a Multicomputer", Journal of Parallel and Distributed Computing, vol. 40, pp. 119–130 (1997).*

Abali, B. and Stunkel, C.B., "Time Synchronization on SP1 and SP2 Parallel Systems", Parallel Processing Symposium, pp. 666–672, (1995).*

* cited by examiner

Primary Examiner—Thomas Lee
Assistant Examiner—Albert Wang
(74) Attorney, Agent, or Firm—Lawrence D. Cutter; Jon A. Gibbons; Fleit, Kain, Gibbons, Gutman & Bongini P.L.

(57) ABSTRACT

Apparatus for synchronizing time-of-day events across a plurality of neighboring processing nodes organized in a distributed parallel processing system with each processing node including a time-of-day (TOD) incrementor. The TOD incrementor of each processing node is coupled to a local oscillator in the processing node running at a preselected frequency to increment locally the TOD incrementor. A controller determines one of the processing nodes as the master processing node by transmitting an initialization packet to the selected processing node, and transmits a set TOD service packet to the selected master processing node. The master processing node includes a broadcast generator that broadcasts TOD update packets to neighboring processing nodes. A register in the master processing node counts a multiple of the preselected frequency. The broadcast generator in the master processing node includes a broadcast transmitter responsive to the register, to broadcast TOD update packets, based on the TOD incrementor of the master processing node, via transmission paths to neighboring processing nodes. A receiver in each neighboring processing node updates its TOD incrementor responsive to a broadcast update packet received from the master processing node.

37 Claims, 9 Drawing Sheets

ACCURATE DISTRIBUTED SYSTEM TIME OF DAY

PARTIAL WAIVER OF COPYRIGHT

All of the material in this patent application is subject to copyright protection under the copyright laws of the United States and of other countries. As of the first effective filing date of the present application, this material is protected as unpublished material. However, permission to copy this material is hereby granted to the extent that the copyright owner has no objection to the facsimile reproduction by anyone of the patent documentation or patent disclosure, as it appears in the United States Patent and Trademark Office patent file or records, but otherwise reserves all copyright rights whatsoever.

CROSS-REFERENCE TO RELATED APPLICATIONS

Not Applicable

BACKGROUND OF THE INVENTION

1. Field of the Invention

The present invention relates to a method and apparatus for a distributed parallel processing system in which there is a need for a single Time Of Day (TOD) or incrementor to synchronize (order) events across the different processors.

2. Description of the Related Art

To order events accurately that occur on a distributed processing system, the difference between TODs read on two different processors simultaneously must be less than the smallest latency for a message between the two processors, and must be continuously increasing. Today this is done by either having a single central TOD repository or by running the entire system off a single clock propagated to all the processors (nodes). The central repository has the disadvantage of being a bottleneck to processing because all nodes need to query this single node, and as a consequence, all these queries are serialized, reducing the speed up that is intended to be achieved by parallelizing the application. Using a single system oscillator that is propagated through the system has the disadvantage of requiring specific links between nodes to be operational, or the system fails. Since on a large distributed system these links are required to be cables that can be accidently pulled, a real concern exists.

SUMMARY OF THE INVENTION

The present invention overcomes the disadvantages of the known art by a hardware and software implementation that allows all the processing nodes to increment their TOD off a local oscillator and keeps them within the minimum latency by broadcasting periodic updates. In essence, the invention provides a TOD incrementor throughout a distributed system without requiring a clock to be distributed, and with a maximum difference less than the minimum latency, as opposed to prior art solutions that either had a larger maximum difference or distribute a clock to run the TOD synchronously. Through the use of the present invention, the reading of the TOD to all of the processing nodes is distributed thereby removing the need for a single centralized TOD source. The present invention also removes the need for specific cables being operational (as in a single system oscillator design). As long as there is a path from a "TOD Master Chip" to a node, the TOD is kept within tolerance.

The present invention utilizes a switch design that is implemented in hardware and software to accurately update and distribute a received TOD to all its neighbors. The method and apparatus of the present invention includes the capability of calculating the delay of the cables connected to the switch designated as the "TOD Master Chip", and the capability to receive a special TOD broadcast packet and update it with the calculated cable delay. The invention further includes the capability to adjust the local TOD to the received broadcast value without decrementing the value, and the capability to send the TOD broadcast packet to all its neighbors. The last-mentioned capability serves to detect whether the neighbor has already received a specific update, in which case, the received packet is discarded (ending the feedback loop).

In the method and apparatus of the present invention, the TOD adjustments can be simple loads of the received broadcast when the newly received value is greater than the local copy. However, if the local copy is greater than the received broadcast, the local copy must be held or incremented at a slower rate until the difference is removed (in the design according to the invention, the local value is incremented at a fractional value, e.g. half speed, until it matches the received value which is being incremented at normal speed).

From a system perspective, the invention is implemented with the capability to select a single switch or node to be the "TOD Master Chip". This "TOD Master Chip" periodically initiates a TOD broadcast by sending TOD broadcast packets to all of its neighbors. The TOD broadcast packet contains the current TOD value and a sequence number (used to detect feedback loops). The TOD broadcast packet may also include a flag indicating that it is a TOD broadcast packet, rather than a normal data packet, and may also include a checksum to detect errors in the packet. For system reliability, a backup that monitors the "TOD Master Chip" and takes over its function when that chip fails may be provided.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention will be apparent from the following detailed description taken in conjunction with the accompanying drawings.

DETAILED DESCRIPTION OF AN EMBODIMENT

However, it should be understood that these embodiments are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in the plural and visa versa with no loss of generality.

Distributed Computing Environment

Figure 1:
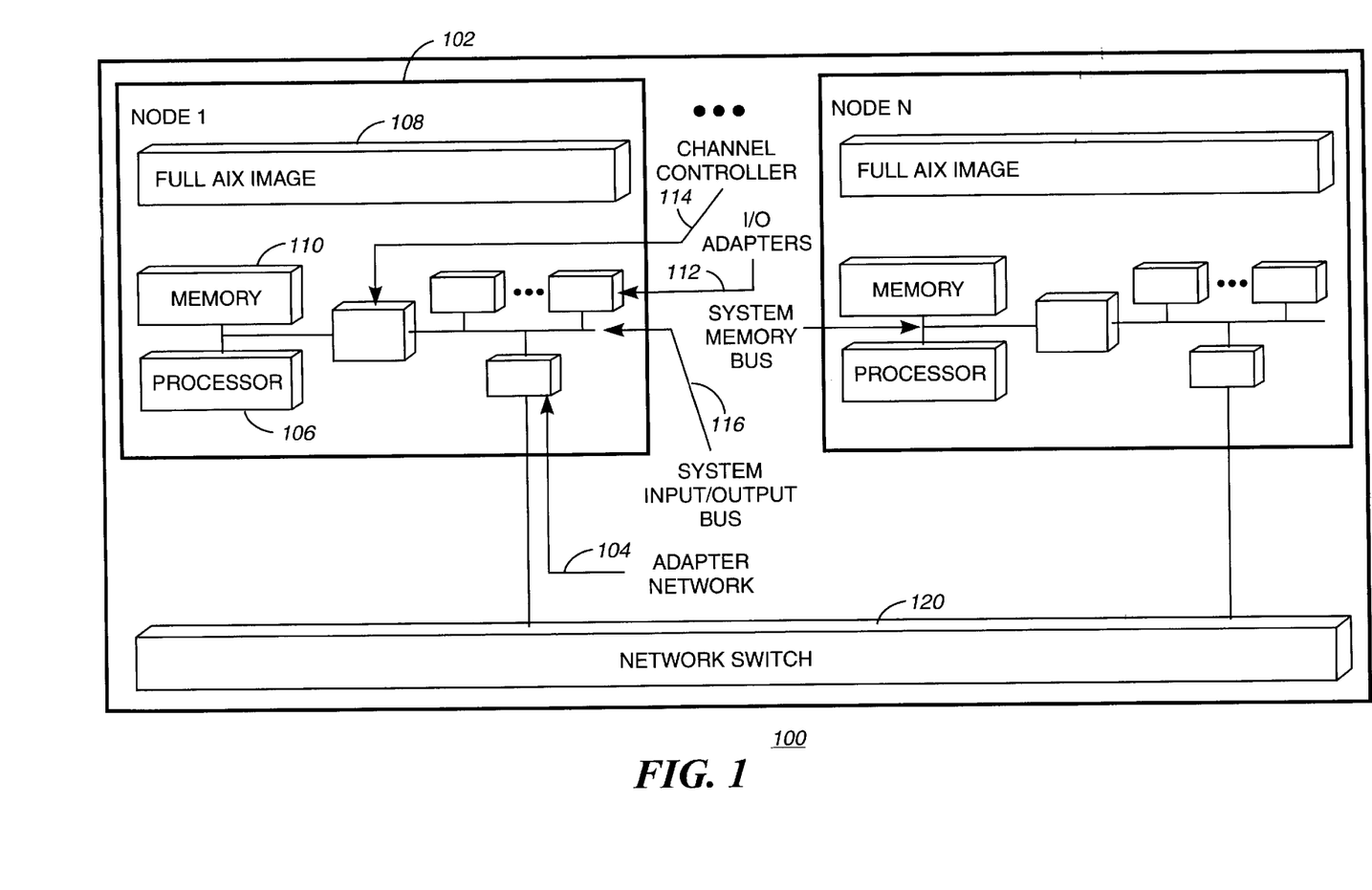
FIG. 1 depicts one example of a highly parallel distributed multiprocessor systems computing environment incorporating the principles of the present invention.

Referring now in more detail to the drawings in which like numerals refer to like parts throughout several views, FIG. 1 is a block diagram of a distributed computing environment 100 that includes a plurality of nodes 102 coupled to one another via a plurality of network adapters 104. Each node 102 is an independent computer with their own operating system image 108, memory 110 and processor(s) 106 on a system memory bus 118, a system input/output bus 116 couples I/O adapters 112 and network adapter 104. Each network adapter is linked together via a network switch 120.

In one example, distributed computing environment 100 includes N nodes 102 with one or more processors 106. In one instance, each processing node is, a RISC/6000 computer running AIX, the IBM version of the UNIX operating system. The processing nodes do not have to be RISC/6000 computers running the AIX operating system. Some or all of the processing nodes 102 can include different types of computers and/or different operating systems 108. All of these variations are considered a part of the claimed invention.

Figure 2:
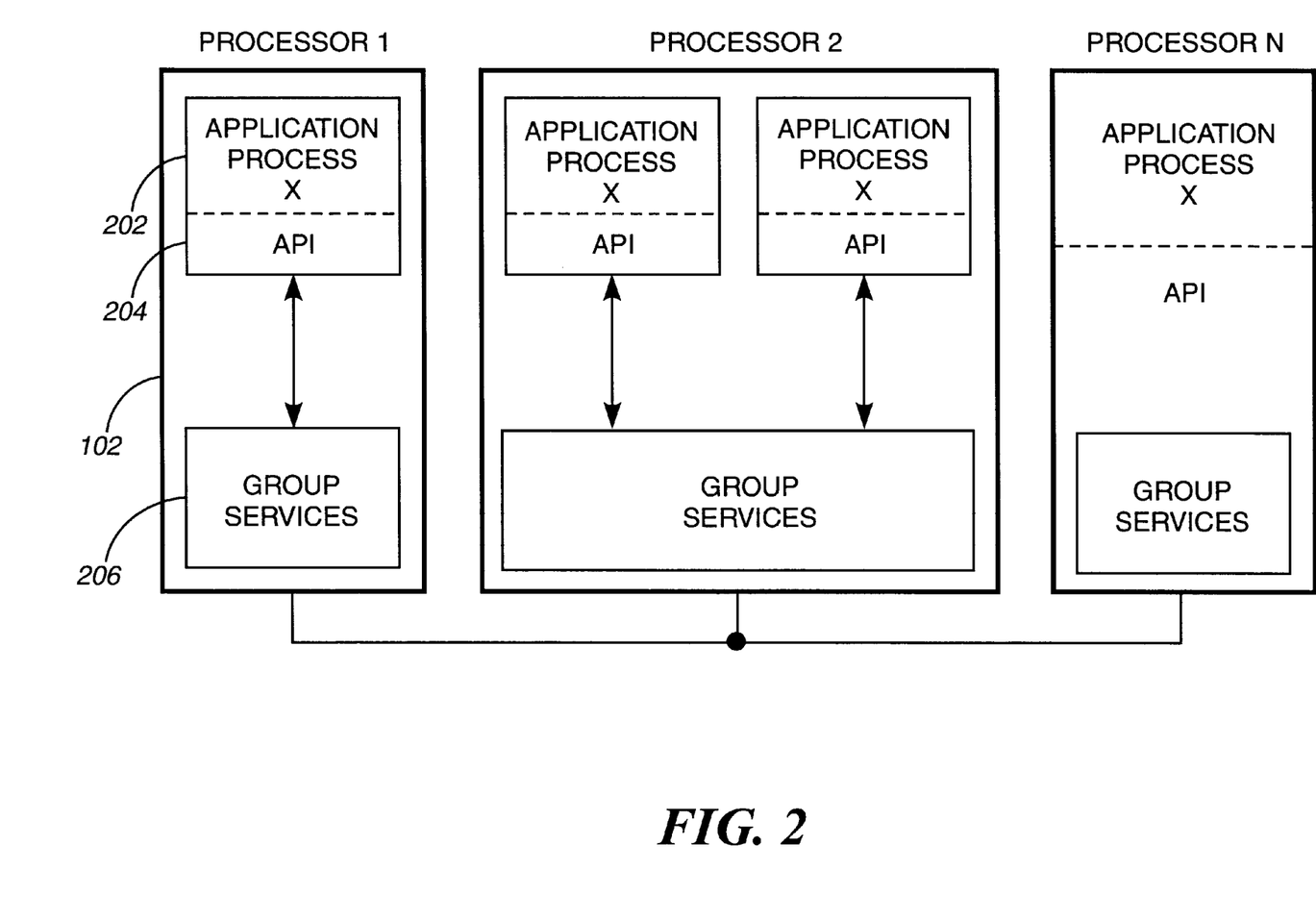
FIG. 2 depicts one example of an expanded view of a number of the processing nodes of the distributed computing environment of FIG. 1, in accordance with the principles of the present invention.

In FIG. 2 shown is an expanded view of a number of processing nodes 102 of the distributed computing environment 100 of FIG. 1, according to the present invention. In one embodiment, a Group Services 206 subsystem incorporating the mechanisms of the present invention is distributed across a plurality of the processing node 106 of the distributed computing environment 100. In particular, in one example, a Group Services daemon (not shown) is located within one or more of the processing nodes 106. The Group Services daemon are collectively referred to as Group Services 206.

Group Services facilitate, for instance, communication and synchronization between multiple processes f the process group, and be used in a variety of situations, including, for example, providing a distributed recovery synchronization mechanism. A process 202 desiring of using facilities of Group Services 206 is coupled to a Group Services daemon 200. In particular, the process is coupled to the Group Services by linking at least part of the code associated with Group Services (e.g. library code) into its own code. In accordance with one embodiment, an application process 202 uses mechanisms of the present invention via an application programming interface 204. In particular, the application programming interface provides an interface for the application process 202 to use the mechanisms of the present invention.

Figure 3:
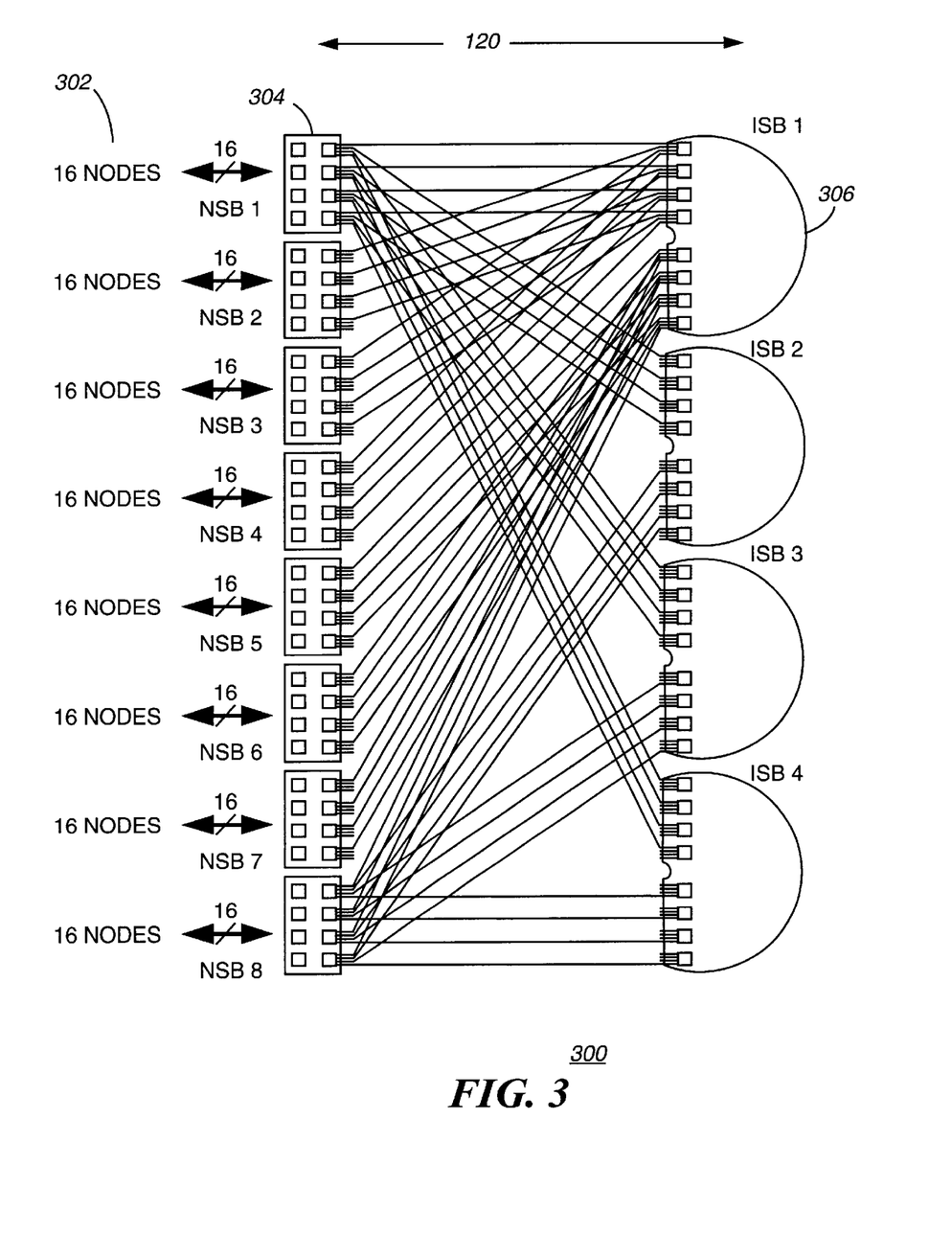
FIG. 3 is a schematic diagram of a high level block diagram of FIG. 1 for a distributed multiprocessor system, in an embodiment for a 128 way processor distributed system, according to the present invention.

Turning to FIG. 3, shown is a schematic diagram of a high level block diagram of FIG. 1 for a distributed multiprocessor system, in an embodiment for a 128 way processor distributed system 300. The distributed system 300 is comprised of nodes 304, in this embodiment, workstations), connected through a network switch 120. The network switch 120 is comprised of two types of switches: (1) node switch boards (NSB) 308 and (2) intermediate switch boards (ISB) 310. The difference between the NSB 304 and the ISB 310 is that ISB 310 connects just switches, while the NSB 304 connects both switches and nodes. The NSB 304 and the ISB 310 are identical and just connect to different components, i.e, switches and nodes versus just switches.

Switch Boards and TOD Hardware

Figure 4:
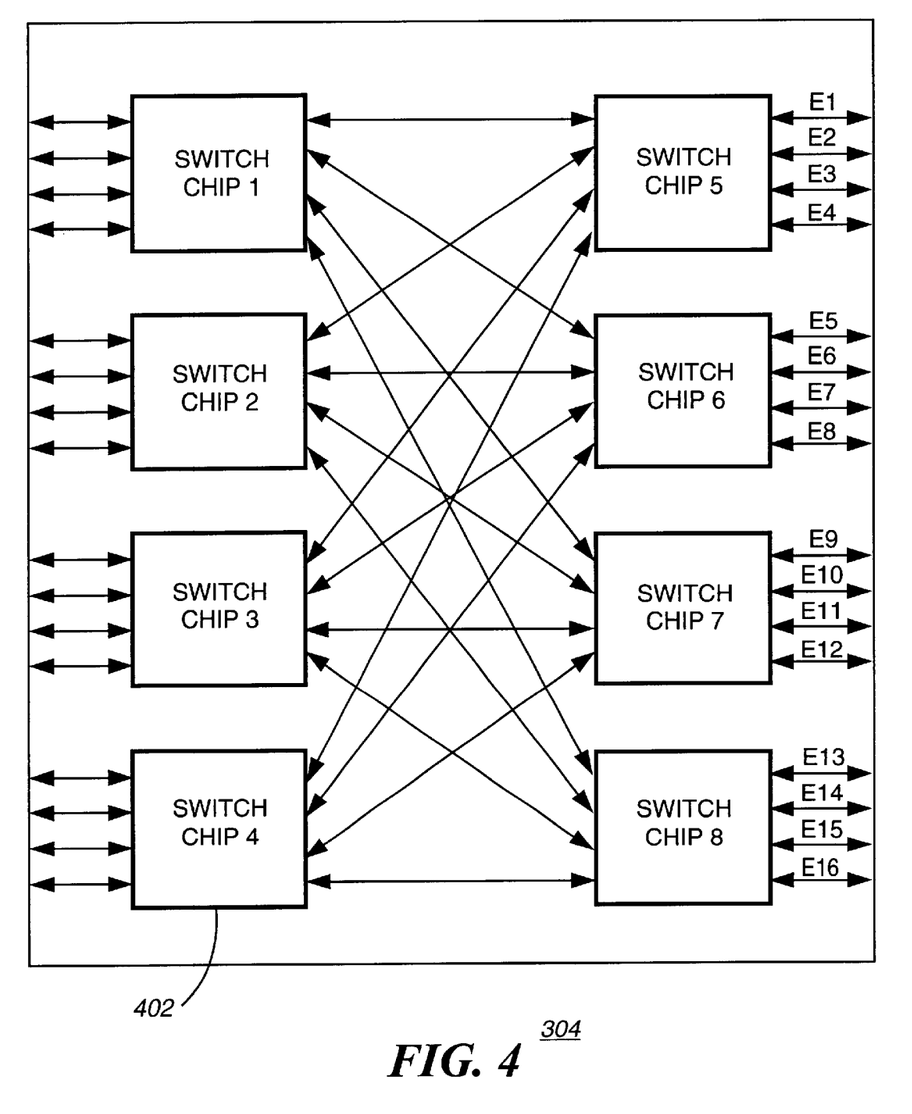
FIG. 4 is a schematic diagram of a switch board of the distributed system of FIG. 3, according to the present invention.
Figure 5:
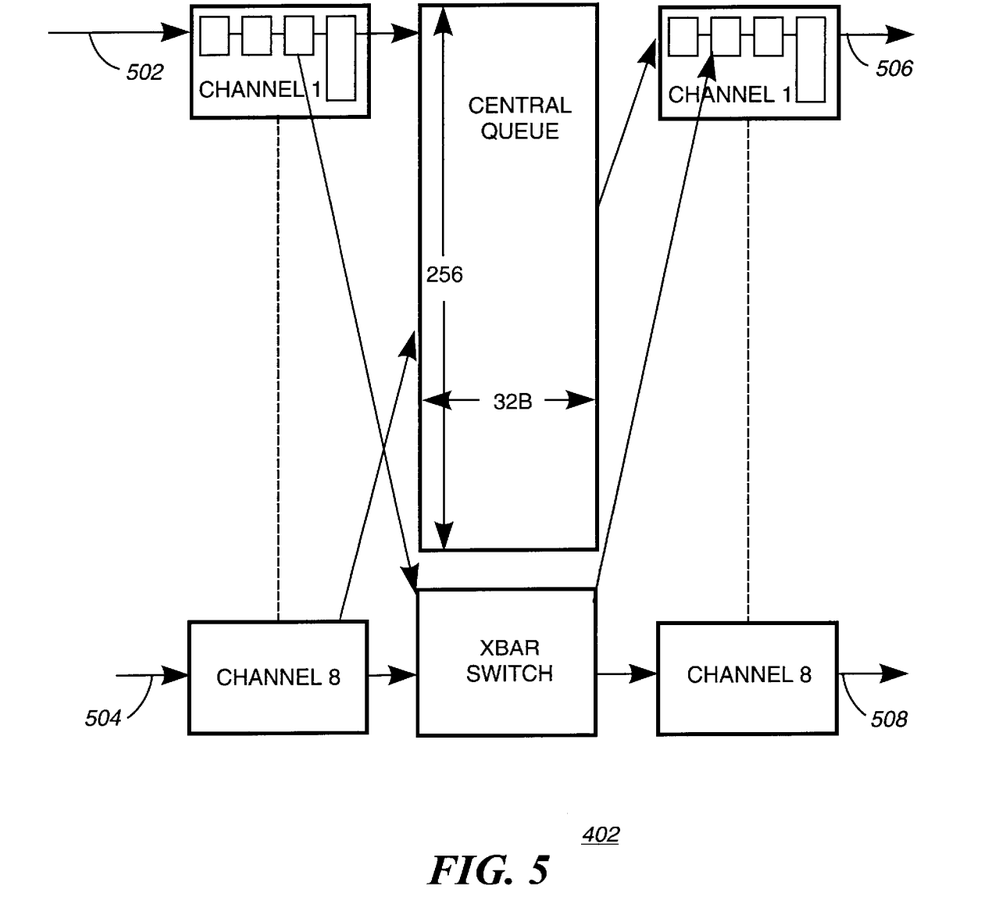
FIG. 5 is a schematic diagram of a switch chip (not including service logic), according to the present invention.
Figure 6:
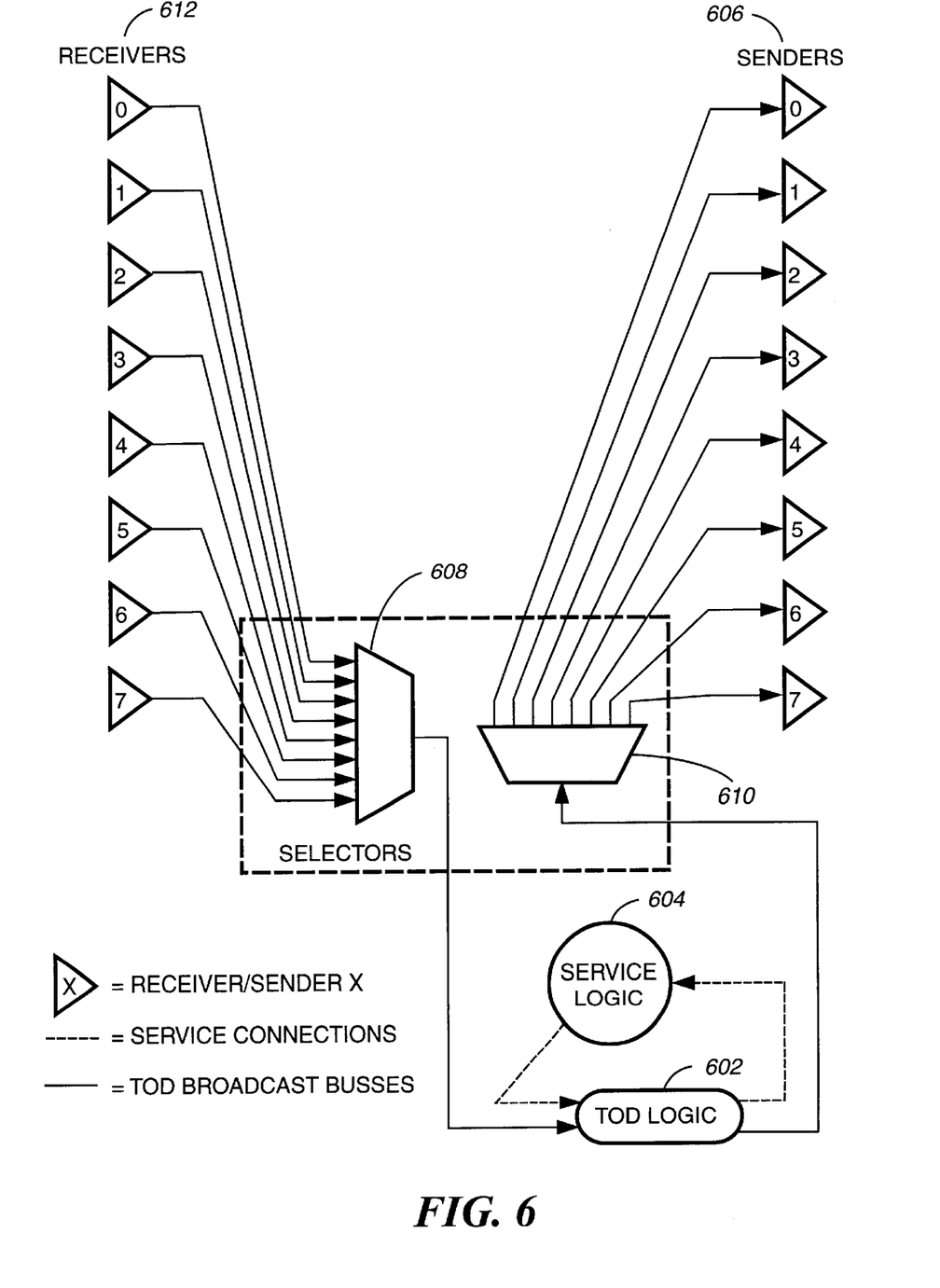
FIG. 6 is a schematic diagram of a switch chip showing the novel TOD and service logic connection; according to the present invention.
Figure 7:
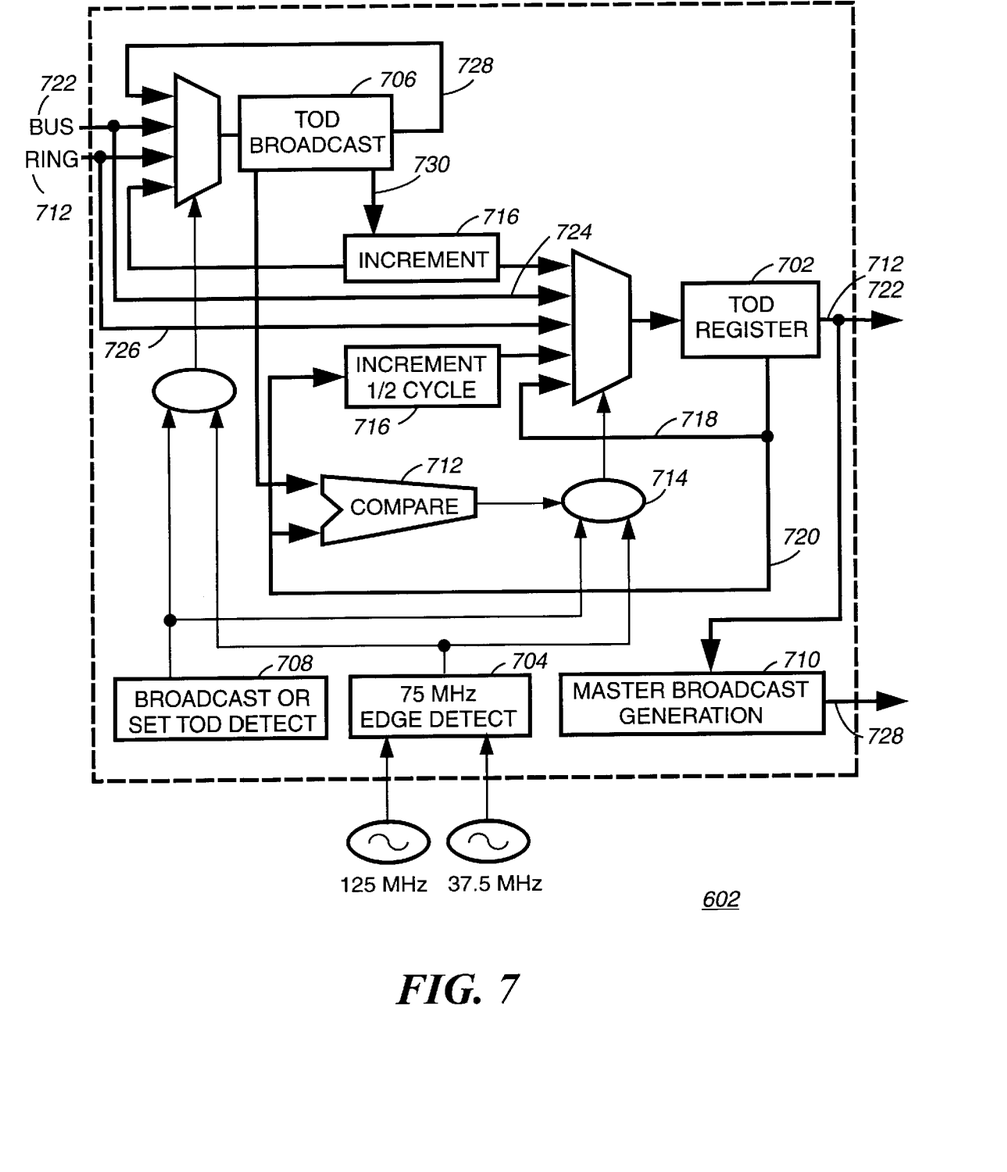
FIG. 7 is a schematic diagram showing the top high level control logic of the TOD Master Chip.

FIG. 4 illustrates a single switch board. The switch boards 304 consists of 8 switch chips 402, labeled 1 to 8, connected together. FIG. 5 illustrates the main data paths, 502–504 of a normal switch, but FIG. 5 does not include any connections or logic for handling the invention as described herein. FIG. 6 illustrates the additional connections and blocks needed for the present invention. The additional logic includes the TOD Logic 602 and the service logic 604. The TOD Logic 602 is illustrated in FIG. 7, and will be described in more detail hereinafter. The service logic 604 consists of whatever logic is needed to allow the initialization of the TOD register in the TOD Master chip at power on. FIG. 6 also illustrates the connections from all of the receivers 604 to the TOD Logic 602 and from the TOD Logic 602 to all of the senders 612. These connections are required to allow a receiver that receives a TOD broadcast to propagate it to the TOD Logic 602, and for the TOD Logic 602 to send the TOD broadcast out all of the senders 612. Note that in another embodiment, that the senders 612 could receive TOD broadcasts directly from the receivers 604.

At power on, the system administrator selects on switch chip 402 or node 304 to be the "TOD Master". The system administrator will also initialize the TOD value in the "TOD Master". The "TOD Master" will then automatically generate TOD broadcasts every "meta-cycle". The rest of the switch chips 402 in the system when they receive the broadcasts will update their TOD values as described below.

In FIG. 7, the condition "TOD High Level" illustrates the basic TOD Control Logic It consists of two main registers: TOD register 702 and TOD Broadcast Register 706. The TOD Broadcast Register 706 is required to ensure that on TOD updates from the primary TOD chip, the TOD is never decremented—per requirements, the TOD must be ever increasing. For the most part, the TOD Broadcast register 706 will be used to load the TOD register 702 each 75 MHz cycle. Actually, it is the increment using the incrementor 716, of the TOD broadcast register 706 that is used. However, the TOD register 702 must also be able to feedback on itself 718, as well as increment at half speed 716, and load either from a Set TOD packet 724 or a load from the primary TOD chip 728. Similarly, the TOD Broadcast Register 706 must be able to increment 730, feedback on itself 728, and take updates and loads, as explained above.

The Broadcast and Set TOD Detect logic 708 determines if there is an incoming TOD from either a broadcast from the Primary TOD chip or a Set TOD packet. If a broadcast is being received, the TOD comes from the receivers 604 via the SVC Bus 722. If a Set TOD is occurring, the TOD comes from the SVC Ring 712.

The 75 MHz Edge Detect logic 704 as will be further describer below, with reference to operating at the TOD frequency, in the example given it is 75 MHz, and is used to gate the increments of the TOD.

The Master Broadcast Generation logic 710 looks at the TOD register 702 and will initiate a propagate out to the bus 728 of the TOD every fixed number of cycles, as explained further below, and in the given example this meta-cycle equals 65536 TOD cycles (when bit 16 flips). The details on propagation have already been given. This is only done on the Master (or Primary) TOD chip.

TOD Process Flows

Within each processing node 304, a bus interconnects a plurality of switch chips 402 or adapters, also as known in the art. In accordance with the present invention and with reference to the flow chart of FIGS. 8A and 8B, through software implementation (switch initialization code), see step Si, one switch chip 402 or adapter is selected to be the "Primary TOD chip". Once the primary TOD chip has been selected, the hardware waits for the TOD to be set (through a set TOD service packet communicated from a central controller, see steps S2 and S4), then the primary TOD chip automatically propagates the TOD to all switch chips 402 and adapters, see step S6. During the propagation phase, the hardware will automatically adjust the TOD for the delays in the cables and intermediate switches. Therefore, at the end of the TOD propagation, all of the TODs in the system will be within a few cycles of each other (the accuracy should be around three cycles per switch boards 304). Also, in order to handle asynchronous clocks on all of the switch boards 304, the "Primary TOD chip" will propagate its TOD every X number of TOD cycles, e.g. 65536 TOD cycles corresponding to 872 microseconds, referred to hereinafter as a "meta-cycle", see Step S22. The TOD cycles run at Y frequency, e.g. 75 MHz corresponding to 13.3 ns per cycle. For the example given, this means that propagation occurs every time bit 16 of the TOD flips (bit 0 LSB). The propagation of the TOD based on this "meta-cycle" will account for the tolerances of the oscillators and keep the TODs close together. The "Primary TOD chip" will also immediately propagate its TOD following reception of a set TOD packet. Until the meta-cycle is complete, the flow loops back in step S4, and no propagation occurs. The software can be embodied in RAM, ROM or some computer readable medium, such as a 3.5" diskette or CD ROM this is loaded into the TOD Logic 602 using methods known in the art.

Figure 8A:
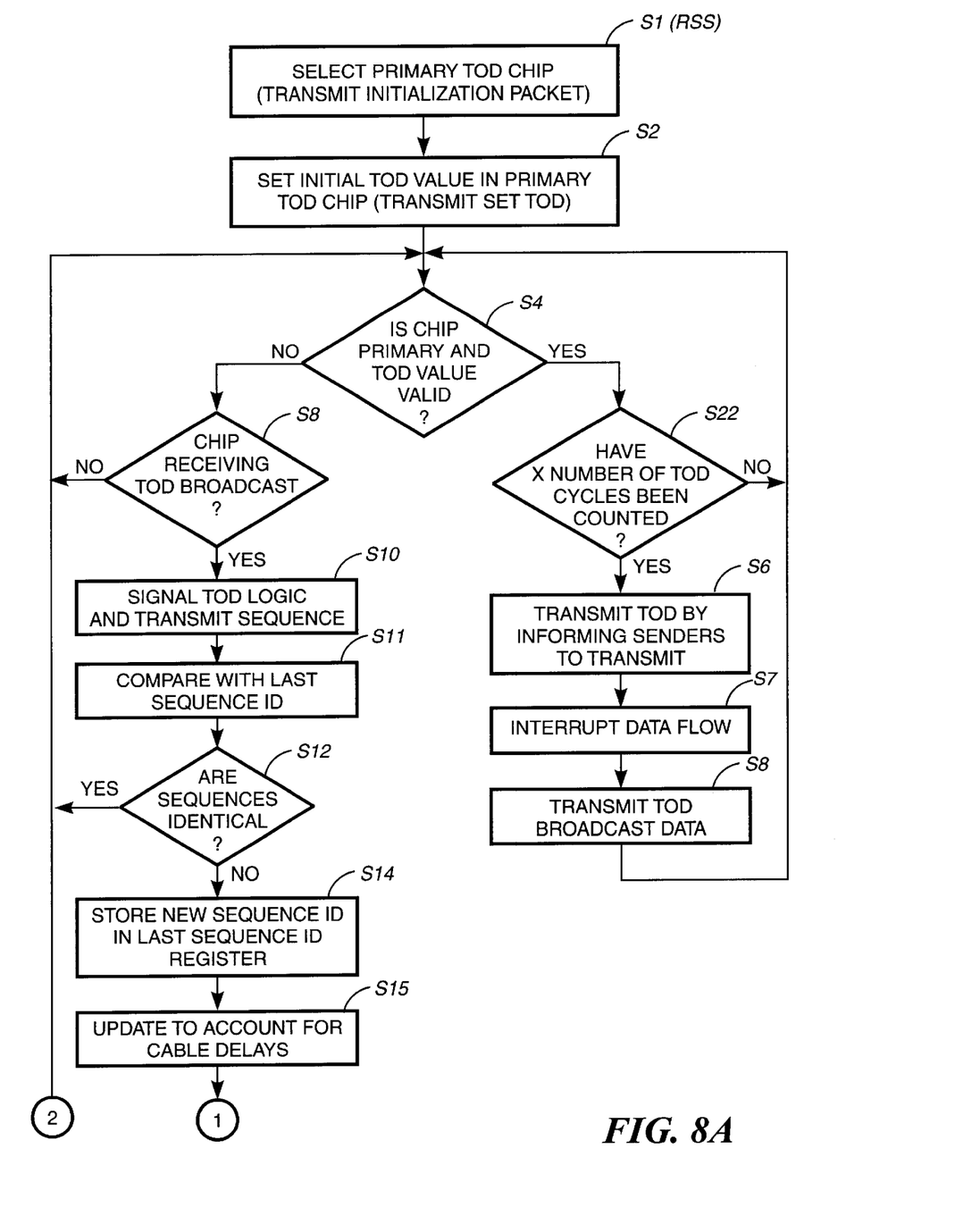
FIGS. 8A and 8B is a flow chart illustrating essential aspects of the method and apparatus of the present invention.

A "Primary TOD chip" is created by software, see step S1. In order to allow software to select the "Primary TOD chip"; a bit is added to the initialization packet. When this bit is set in the initialization packet, the switch chip 402 will not act on it, until the most significant bit of the TOD is set. The most significant bit of the TOD is defined to be a valid bit. Once a chip is selected as the Primary TOD chip, its TOD must be set. This is done with a Set TOD packet, see step S2.

Software must define only one chip to be the "Primary TOD chip". If more than one chip thinks that it is the primary, the two chips will fight each other trying to update the rest of the chips, resulting in possibly different TODs throughout the system. If a TOD Master chip receives a TOD with a different TOD sequence ID, during propagation of TOD, from the one that it most recently sent, it will flag an Invalid TOD Propagate Error. The software sets the most significant bit of the TOD in the "Primary TOD chip" by sending it a Set Time-of-Day packet, see step S2. The bit telling a switch chip 402 it is the "Primary TOD chip" is reset whenever power on reset occurs. Software can also reset the bit by sending the chip a new initialization packet with the bit turned off. Propagation of a TOD will only occur if the Primary TOD chip's TOD is marked as valid, see step S4. Propagation of TOD occurs every 65535 TOD cycles (872 us) in the example given above, and when it occurs, the "Primary TOD chip" propagates its TOD throughout the system by informing all of its senders 612, e.g. eight senders 612, to transmit the TOD, see step S6. When the senders 612 are signaled, they will grab the TOD, interrupt the data flow, see step S7, transmit a TOD control word followed by two words containing the TOD, see step S8, and then continue normal operation. However, as noted above, propagation of a TOD will only occur if the Primary TOD chip's TOD is marked as valid in step S2.

The TOD control word contains one byte indicating that it is the TOD control word, a one byte sequence ID, an update control bit, and an eight bit ECC. The sequence ID gets incremented after every TOD propagate and is used to kill feedback loops in the broadcast. The update control bit is used to indicate that the receiving chips TOD should be updated to this value even if there is a significant difference in the two TODs. The eight bit ECC is an ECC on the 64 bits of the TOD value (same ECC algorithm as is used on 64 bit multicast node masks). If the ECC is not correct, this TOD broadcast will be ignored.

Figure 8B:
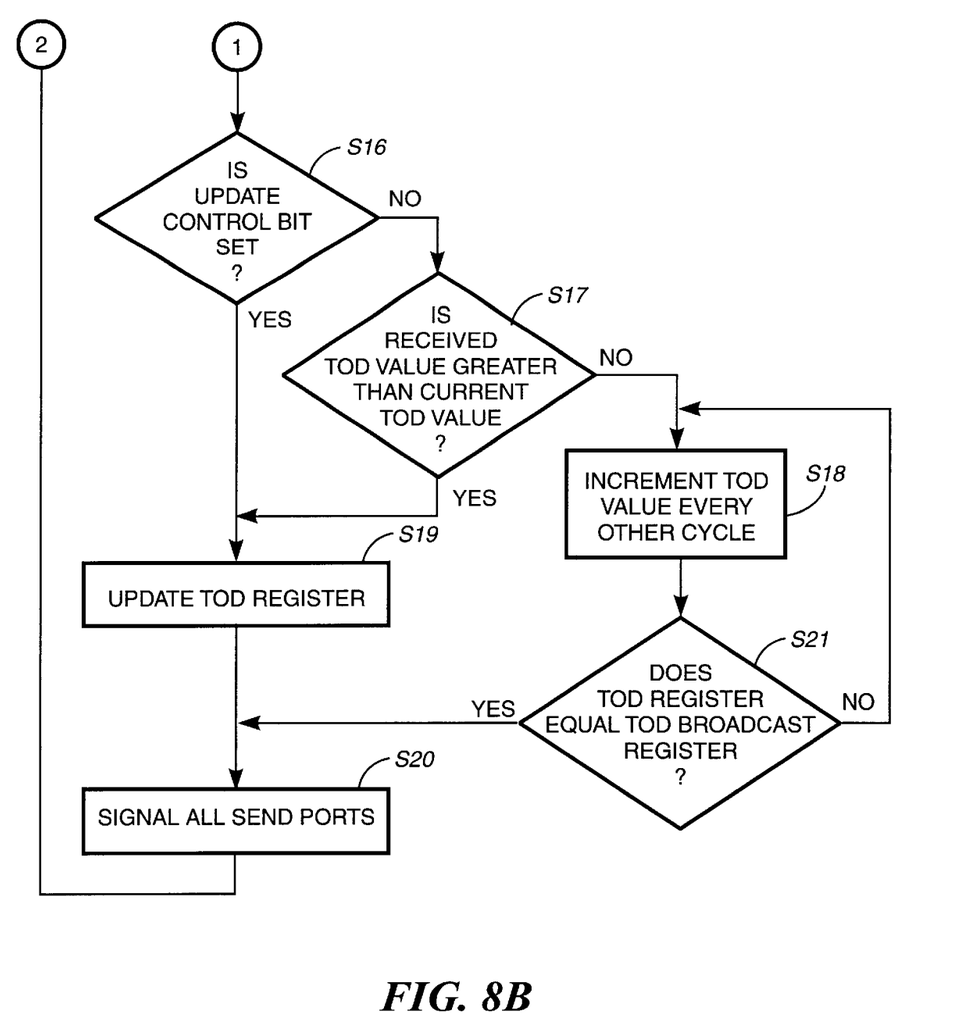

The chips next to the "Primary TOD chip" will receive the TOD character on one of their receiver 604, e.g. eight receive ports, see step S8. When a receiver 604 port receives the TOD control character, it signals the TOD Logic 602 and gives it the sequence ID, see step S10. The TOD Logic 602 compares, using comparator 712, the sequence ID to the last sequence ID register, see step S11. If the sequence IDs are identical, see step S12, the TOD control character is ignored (this chip has already received this TOD update). If they are different, see step S12, the new sequence ID is stored in the last sequence ID register, see step S14, the new TOD is updated to account for cable delays, see step S15, the updated TOD is used to modify the TOD register 702, see step S19, and all of the send ports are signaled to transmit the updated TOD, see step S20.

The TOD register 702 is updated by writing the updated TOD into the TOD register 702, if the update control bit is set 714, see step S16, or if the received TOD value is greater than the current TOD value, see step S17. If the received TOD value is less than the current TOD value and the update control bit is off, the current TOD value will be incremented every other TOD cycle (26.6 ns) using the ½ cycle incrementor 716, until the difference is accounted for, see step S18. This feature guarantees the TOD value is continuously increasing (never decreases). In step S21 a decision is taken whether the TOD register 702 equals the TOD broadcast register.

The send logic receives from the receive half of the port the last TOD sequence ID that it has received. The senders 612 will only send the TOD control character when signaled by the TOD Logic 602 if the last sequence ID register in the central TOD Logic 602 is different than the last sequence ID that the port has received. This restriction is necessary to reduce the number of TOD control characters in the system as quickly as possible. However, since receivers 604 will discard redundant TOD control characters, the design still works if the sender sends the TOD control character while it is receiving the same TOD control character.

If the TOD propagate is done after a Set TOD packet has been received in the Primary TOD chip, a load TOD command will occur (the update bit is set). In this case, the TOD is not tested to be greater than the current TOD value. The propagated TOD will be loaded regardless of its value.

The invention calculates the cable delay between switches using an initialization state (the Ping state) designed to transmit a Ping control character and count the number of TOD cycles, for the example the TOD frequency is 75 MHz, before the Pong character response is received. This delay is then divided by two to get the cable delay (this delay will include the cable and any chip latencies). The divide-by-two will be accomplished by shifting the count right one bit (therefore, the accuracy is about plus or minus one cycle). Based on this, the worst case inaccuracy of the TOD in this design is plus or minus three cycles per switch board hop from the "Primary TOD chip". The TOD is adjusted during propagation for two reasons: cable delay and collisions with an EDC cycle in the sender. Because there is a variable delay in the cable between the sender and receiver, the TOD is modified when it arrives at the receiver. The cable delay is added to the TOD so that it is a much more accurate representation when it arrives at the service logic 604. If the sender can't forward the TOD because EDC is being transmitted when the TOD is requesting to be forwarded, the sender increments the TOD for every cycle that it must be delayed. This improves the accuracy of the TOD when it arrives at the service logic 604.

Every switch boards 304 has two 75 MHz oscillators (internal to the switch chip 402 this is divide-by-2 creating a 37.5 MHz oscillator). This oscillator is used to signal the switch chips 402 when to increment their TOD registers 702. Each switch chip 402 looks for transitions on the resulting 37.5 MHz clock. The input is run through two latches (not shown) clocked off the 125 MHz clock. When a transition is seen on the output, the sender, receivers 604, and main TOD Logic 602 are all signaled to increment their TOD values. The receivers 604 use this signal to gate the counter when timing the link in the Ping State and to increment a TOD that is delayed due to the receiver being busy writing a chunk to the central queue. The senders 612 use the signal to increment the TOD if it is delayed due to an EDC being transmitted.

The switch chips 402 are provided with two 75 MHz clocks in order to prevent any single point of failures on the board. If a switch chip 402 detects that its 'primary' 75 MHz oscillator is not toggling, it will switch to the back up input. Therefore, both 75 MHz oscillators must fail for the board to fail. The oscillators are routed through two different chips for redrive and half the board uses one oscillator as its primary while the other half of the board uses the other oscillator.

The most significant bit of the high order TOD word is used as the valid bit for the TOD. It must be on for the TOD to be considered valid. Therefore, a Set TOD must have the most significant bit high for the TOD to be valid. If the TOD is not valid in the Primary TOD chip, it will not be propagated. Reasons for invalidating the TOD are as follows:

There is a parity error on the TOD register 702
  a) If it is a parity error on the broadcast only, then both the TOD Broadcast and the TOD registers 702 will be invalidated.
  b) If it is a parity error on the TOD register 702 only, then the TOD register 702 will be invalidated, but the TOD Broadcast Register will not be invalidated. Rather, it may be used to load the TOD register 702, and thus recover from the TOD parity error.
2. If a slave TOD chip does not receive a broadcast update for 8 consecutive "TOD meta-cycles", the TOD will be invalidated, because it cannot be guaranteed that the TOD is still in synch with the rest of the system. A "meta-cycle" consists of a fixed number of cycles, in the example given the fixed number is 65535 TOD cycles. A TOD cycle in the given example is 13.3 ns (75 MHz).

Although a specific embodiment of the invention has been disclosed, it will be understood by those having skill in the art that changes can be made to this specific embodiment without departing from the spirit and scope of the invention. The scope of the invention is not to be restricted, therefore, to the specific embodiment, and it is intended that the appended claims cover any and all such applications, modifications, and embodiments within the scope of the present invention.

What is claimed is:

1. A method of synchronizing events across a plurality of neighboring processing nodes organized in a processing system, each processing node including an event incrementor, comprising the steps of:
  normally incrementing the event incrementor of each node off a local oscillator in the node running at a preselected frequency;
  designating one node as a master node;
  broadcasting updates of an event by the master node, based on its event incrementor, via transmission paths to neighboring nodes periodically at times that are a multiple of the preselected frequency;
  comparing, by the neighboring nodes, an update value received with its event incrementor value, responsive to the update received from the master node;
  wherein if the update value is smaller than the event incrementor value, then incrementing the event incrementor value at a fractional value of its normal incrementation until the update value is reached; and
  retransmitting, by the neighboring nodes, the received broadcast update to other nodes when the update value is no smaller than the event incrementor value.

2. The method of claim 1 further comprising the step of:
  wherein if the update value is larger than the event incrementor value, then incrementing the event incrementor value to the update value.

3. The method of claim 1 wherein the step of broadcasting is carried out by an event broadcast packet.

4. The method of claim 1 including the further step of each neighboring node retransmitting the received broadcast update to other nodes if an update control bit is set.

5. The method of claim 1 wherein the step of comparing further includes the step of calculating the delay of the transmission path connecting each receiving neighboring node with the master node, and adjusting a value of the received broadcast based on the calculated delay.

6. The method of claim 1 including the further steps of:
  establishing a remote station having a communication link with the master node; and
  broadcasting a set event packet to the master node via the communication link.

7. The method of claim 6 wherein the designation of the master node is effected by a broadcast packet sent from the remote station via the communication link to the master node.

8. The method of claim 1 wherein the event is time of day.

9. The method of claim 1 wherein a neighboring node will reject a broadcast received from the master node after a hiatus of a predetermined number of consecutive periods.

10. The method of claim 1 wherein the step of broadcasting further includes inserting into the broadcast update a sequence ID number.

11. The method of claim 1 wherein the step of broadcasting further includes inserting into the broadcast update a flag indicating it is an event broadcast update.

12. The method of claim 1 wherein the step of broadcasting further includes inserting into the broadcast update a checksum to detect errors in the broadcast update.

13. An apparatus for synchronizing events across a plurality of neighboring processing nodes organized in a processing system, each processing node including an event incrementor, comprising:

at least one local oscillator in the node running at a preselected frequency to increment the event incrementor;

one of the nodes constituting a master node, and including a broadcast generator for broadcasting updates of an event by the master node to neighboring nodes and a register for counting a multiple of the preselected frequency;

a broadcast transmitter responsive to the register to broadcast updates of the event by the master node, based on its event incrementor, via transmission paths to neighboring nodes; and a receiver in each neighboring node for comparing an update value received with its event incrementor value, responsive to the update received from the master node, wherein if the update value is smaller than the event incrementor value, then incrementing the event incrementor value at a fractional value of its normal incrementation until the update value is reached; and wherein the update value received is retransmitted to at least one of the nodes when the update value is no smaller than the event incrementor value.

14. The apparatus of claim 13 wherein if the update value is larger than the event incrementor value, then incrementing the event incrementor value to the update value.

15. The apparatus of claim 13 wherein the broadcast transmitter generates an event broadcast packet.

16. The apparatus of claim 13 including each neighboring node having a transmitter that retransmits the received broadcast update to other nodes if an update control bit is set.

17. The apparatus of claim 13 including each receiving neighboring node a calculator that calculates the delay of the transmission path connecting each receiving neighboring node with the master node, and adjusts the value of the received broadcast based on the calculated delay.

18. The apparatus of claim 13 including a remote station having a communication link with the master node, and broadcast transmitter in the remote station that broadcasts a set event packet to the master node via the communication link.

19. The apparatus of claim 18 wherein the master node is established by a broadcast packet sent from the remote station via the communication link to the master node.

20. The apparatus of claim 13 wherein the event is time of day.

21. The apparatus of claim 13 including circuitry in a neighboring node for rejecting a broadcast received from the master node after a hiatus of a predetermined number of consecutive periods.

22. The apparatus of claim 13 wherein the broadcast update includes a sequence ID number.

23. The apparatus of claim 13 wherein the broadcast update includes a flag indicating it is an event broadcast update.

24. The apparatus of claim 13 wherein into the broadcast update includes a checksum to detect errors in the broadcast update.

25. An apparatus for synchronizing time-of-day events across a plurality of neighboring processing nodes organized in a distributed parallel processing system, each processing node including a time-of-day (TOD) incrementor, comprising:

at least one local oscillator in a processing node running at a preselected frequency to increment locally the TOD incrementor;

a controller for determining one of the processing nodes as a master processing node by transmitting an initialization packet to a selected processing node, and for transmitting at intervals a set TOD service packet to the selected master processing node;

a broadcast generator in the master node, for broadcasting TOD update packets to neighboring processing nodes and a register for counting a multiple of the preselected frequency;

wherein the broadcast generator includes a broadcast transmitter responsive to the register to broadcast TOD update packets, based an the TOD incrementor of the master processing node, via transmission paths to neighboring processing nodes, a receiver in each neighboring processing node for comparing a broadcast update packet value received with its TOD incrementor value, responsive to the broadcast update packet received from the master node, wherein if the broadcast update packet value is smaller than the TOD incrementor value, then incrementing the TOD incrementor value at a fractional value of its normal incrementation until the broadcast update packet value is reached; and wherein the update packet value received is retransmitted to at least one of the nodes when the update packet value is no smaller than the TOD incrementor value.

26. A computer readable medium containing program instructions for synchronizing events across a plurality of neighboring processing nodes organized in a processing system, each processing node including an event incrementor, comprising the instructions of:

normally incrementing the event incrementor of each node off a local oscillator in the node running at a preselected frequency;

designating one node as a master node;

broadcasting updates of an event by the master node, based on its event incrementor, via transmission paths to neighboring nodes periodically at times that are a multiple of the preselected frequency;

comparing, by the neighboring nodes, on update value received with its event incrementor value, responsive to the update received from the master node; and wherein if the update value is smaller than the event incrementor value, then incrementing the event incrementor value at a fractional value of its normal incrementation until the update value is reached; and wherein the update packet value received is retransmitted to at least one of the nodes when the update packet value is no smaller than the TOD incrementor value.

27. The computer readable medium of claim 26 further comprising the instructions of:

wherein if the update value is larger than the event incrementor value, then incrementing the event incrementor value to the update value.

28. The computer readable medium of claim 26 wherein the instruction of broadcasting is carried out by an event broadcast packet.

29. The computer readable medium of claim 26 including the further step of each neighboring node retransmitting the received broadcast update to other nodes if an update control bit is set.

30. The computer readable medium of claim 26 wherein the instruction of incrementing further includes the step of calculating the delay of the transmission path connecting each receiving neighboring node with the master node, and adjusting a value of the received broadcast based on the calculated delay.

31. The computer readable medium of claim 26 including the further steps of:
- establishing a remote station having a communication link with the master node; and
- broadcasting a set event packet to the master node via the communication link.

32. The computer readable medium of claim 26 wherein the designation of the master nodo is effected by a broadcast packet sent from the remote station via the communication link to the master node.

33. The computer readable medium of claim 26 wherein the event is time of day.

34. The computer readable medium of claim 26 wherein a neighboring node will reject a broadcast received from the master node after a hiatus of a predetermined number of consecutive periods.

35. The computer readable medium of claim 26 wherein the instruction of broadcasting further includes inserting into the broadcast update a sequence ID number.

36. The computer readable medium of claim 26 wherein the instruction of broadcasting further includes inserting into the broadcast update a flag indicating it is an event broadcast update.

37. The computer readable medium of claim 26 wherein the instruction of broadcasting further includes inserting into the broadcast update a checksum to detect errors in the broadcast update.

* * * * *

UNITED STATES PATENT AND TRADEMARK OFFICE
CERTIFICATE OF CORRECTION

PATENT NO.    : 6,618,815 B1                                           Page 1 of 1
DATED         : September 9, 2003
INVENTOR(S)   : Mark G. Atkins et al.

It is certified that error appears in the above-identified patent and that said Letters Patent is hereby corrected as shown below:

Column 3,
Line 49, change "processes f the" to -- processes of the --

Column 4,
Line 41, change "Logic It" to -- Logic. It --

Column 5,
Line 14, change "step Si," to -- step S1, --

Column 9,
Line 1, change "Tho" to -- The --
Line 8, change "in the node" to -- in a node --

Column 10,
Line 20, change "based an the" to -- based on the --
Line 48, change "on update" to -- an update --

Column 11,
Line 14, change "master nodo" to -- master node --

Signed and Sealed this

Fourteenth Day of October, 2003

JAMES E. ROGAN
*Director of the United States Patent and Trademark Office*